(12) United States Patent
Patel et al.

(10) Patent No.: US 8,877,305 B2
(45) Date of Patent: Nov. 4, 2014

(54) LOW APPLICATION TEMPERATURE HOT MELT ADHESIVE

(75) Inventors: Jagruti B. Patel, Branchburg, NJ (US); Andrea Keys Eodice, Manville, NJ (US); Yew Guan Low, Basking Ridge, NJ (US)

(73) Assignee: Henkel US IP LLC, Rocky Hill, CT (US)

( * ) Notice: Subject to any disclaimer, the term of this patent is extended or adjusted under 35 U.S.C. 154(b) by 0 days.

(21) Appl. No.: 13/361,197

(22) Filed: Jan. 30, 2012

(65) Prior Publication Data

US 2012/0128833 A1   May 24, 2012

Related U.S. Application Data

(63) Continuation of application No. PCT/US2010/043804, filed on Jul. 30, 2010.

(60) Provisional application No. 61/230,322, filed on Jul. 31, 2009.

(51) Int. Cl.
| | | |
|---|---|---|
| *B32B 1/02* | (2006.01) | |
| *C08L 23/08* | (2006.01) | |
| *C09J 123/08* | (2006.01) | |
| *C09J 191/06* | (2006.01) | |
| *C08L 91/06* | (2006.01) | |
| *C08L 51/06* | (2006.01) | |

(52) U.S. Cl.
CPC ........ *C09J 123/0815* (2013.01); *C08L 23/0815* (2013.01); *C08L 91/06* (2013.01); *C08L 2205/02* (2013.01); *C09J 191/06* (2013.01); *C08L 51/06* (2013.01)
USPC ....... 428/34.1; 428/34.8; 428/35.2; 428/35.7; 428/36.92; 524/528; 525/240

(58) Field of Classification Search
USPC ..................... 524/19, 62, 275–279, 478–480, 524/487–489, 763, 528; 428/34.1, 34.8, 428/35.2, 35.7, 36.4, 36.6, 36.92; 525/240
See application file for complete search history.

(56) References Cited

U.S. PATENT DOCUMENTS

| | | |
|---|---|---|
| 3,577,398 A | 5/1971 | Pace et al. |
| 6,299,985 B1 | 10/2001 | Zhang et al. |
| 6,319,979 B1 | 11/2001 | Dubois et al. |
| 6,833,404 B2 | 12/2004 | Quinn et al. |
| 7,208,541 B2 | 4/2007 | Gong et al. |
| 7,223,814 B2 | 5/2007 | Martin et al. |
| 7,279,528 B2 | 10/2007 | Macedo et al. |
| 7,378,481 B1 | 5/2008 | Gong et al. |
| 7,429,634 B2 | 9/2008 | Brant et al. |
| 7,524,910 B2 | 4/2009 | Jiang et al. |
| 8,431,643 B2 * | 4/2013 | Rodriguez et al. ............ 524/477 |
| 2004/0220336 A1 | 11/2004 | Abhari et al. |
| 2007/0282072 A1 | 12/2007 | Hoffmann et al. |
| 2008/0264562 A1 | 10/2008 | Merrill et al. |
| 2008/0306194 A1 | 12/2008 | Sun et al. |

FOREIGN PATENT DOCUMENTS

| | | |
|---|---|---|
| JP | 2008214539 A | 9/2008 |
| WO | 0000565 A1 | 1/2000 |
| WO | 2005078033 A1 | 8/2005 |

\* cited by examiner

*Primary Examiner* — Walter B Aughenbaugh
(74) *Attorney, Agent, or Firm* — Sun Lee Lehmann

(57) ABSTRACT

High temperature performance hot melt adhesives are formulated for application at low temperature, i.e., below 300° F. Hot melt adhesive formed with metallocene polymer together with a maleated polyethylene wax show an excellent balance of high and low temperature performance and are particularly useful as packaging case and carton adhesive.

13 Claims, 1 Drawing Sheet

Heat Stress test block

LOW APPLICATION TEMPERATURE HOT MELT ADHESIVE

CROSS-REFERENCE TO RELATED APPLICATIONS

Figure 1A:
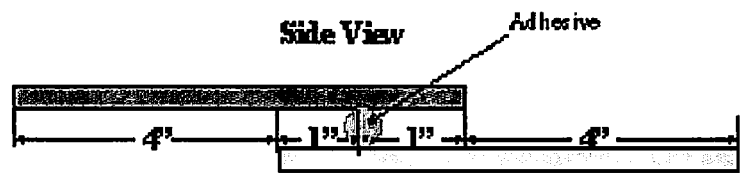

This application is a continuation of International Application No. PCT/US2010/043804 filed Jul. 30, 2010, which claims the benefit of U.S. Provisional Patent Application No. 61/230,322 filed Jul. 31, 2009, the contents of both of which are incorporated herein by reference.

FIELD OF THE INVENTION

The invention relates to a hot melt adhesive, more specifically a low application temperature hot melt adhesive that have both high heat resistance and good cold temperature performance. The adhesive is particularly well suited for packaging applications.

BACKGROUND OF THE INVENTION

Hot melt adhesives are applied to a substrate when molten, then placed in contact with a second substrate. The adhesive cools and hardens to form a bond between the substrates. Hot melts are widely used for industrial adhesive applications such as product assembly and packaging. The latter include case and carton sealing.

Hot melt adhesives are widely used in packaging industry to seal cardboard cases, trays, and cartons. Some of these operations require hot melt adhesive with exceptional high heat resistance (ability to maintain fiber tear at high temperature) without compromising good cold temperature performance. One example is to package freshly baked goods at temperature greater than 140° F. and its subsequent storage at freezer temperatures of −20° F. Another example that requires hot melt adhesives with good heat and cold resistance is in the process of shipping sealed cases, cartons or trays by trucks or railway. The temperature in a truck could be very high (up to 145° F.) in the summer or very low in the winter (−20° F.). The hot melt adhesives used should be strong enough such that the sealed containers will not pop open during the transportation process.

Hot melts for packaging applications such as case and carton sealing are typically composed of a polymer, a diluent (usually a tackifier) and a wax. The wax serves several functions. Because it is low in molecular weight, it reduces viscosity. Low viscosity helps to lower application temperatures, provide cleaner processing, and also good wet out of the substrates. In addition, the wax crystallizes quickly which helps the material to harden or set quickly. Fast set speed is important for high speed production. Lastly, the wax provides temperature resistance to the final bond due to its elevated melting point.

Conventional packaging adhesives use petroleum-derived waxes such as paraffin and microcrystalline wax. The lower molecular weight of paraffin wax, makes it the primary choice for low application temperature adhesives.

While hot melt adhesives based on ethylene vinyl acetate and/or ethylene n-butyl acrylate having been used in packaging applications, there continues to be a need for new and improved hot melts formulations, including formulations based on new polymers, or particular combinations of polymers that possess both high heat resistance and good cold adhesion. The current invention addresses this need.

SUMMARY OF THE INVENTION

The invention provides low application temperature hot melt adhesives that comprise a polyolefin copolymer component and a maleated polyethylene wax. The adhesive is formulated for application at a temperature of less than 300° F.

In one embodiment, the low application temperature hot melt adhesive comprises a polyolefin copolymer component and a maleated polyethylene wax component. The polyolefin component comprises two different polyolefin copolymers. At least one polyolefin copolymer is a metallocene-catalyzed ethylene/α-olefin copolymer prepared by polymerizing ethylene with an α-olefin (e.g., butane, hexene, octene) using a metallocene catalytic system, which copolymer has a Melt Index of greater than about 400 g/10 min at 190° C. In one preferred embodiment, the polyolefin copolymer having a Melt Index of greater than about 400 g/10 min at 190° C. is prepared from ethylene and 1-octene monomers.

The adhesive is formulated to have a viscosity at 120° C. of below about 3000 centipoises.

In one embodiment, the adhesive comprises a polyolefin copolymer having a Melt Index of about 500 g/10 min at 190° C. and a polyolefin copolymer having a Melt Index of about 1000 g/10 min at 190° C.

In another embodiment, the adhesive comprises a polyolefin copolymer having a Melt Index of about 1000 g/10 min at 190° C. and a polyolefin copolymer having a Melt Index of less than about 35 g/10 min at 190° C. The lower Melt Index copolymer may desirably have a block structure.

The adhesive formulations of the invention will typically contain the polyolefin copolymer component in amounts not exceeding 30% by weight, more typically 25 to 30 wt %. The maleated polyethylene wax component will typically be present in the adhesive formulation in amounts not exceeding 10% by weight, more typically 5-10 wt %, based on the weight of the adhesive.

The invention also provides articles manufactured using the adhesive of the invention. The adhesive may advantageously be used for sealing and/or forming, for example, cases, cartons, trays, and bags. The invention thus provides a method of sealing and/or forming a case, carton, tray, or bag. The method comprises applying the hot melt adhesive in molten form to a substrate surface to seal and/or form the case, carton, tray, or bag. Also encompassed by the invention are packaged articles, such as a packaged food article, contained within a carton, case, tray or bag, wherein the carton, case, tray or bag has been formed and/or sealed using the hot melt adhesive.

Another embodiment of the invention is directed to a process for bonding a substrate to a similar or dissimilar substrate. The process comprises applying to at least a portion of at least a first substrate a molten hot melt adhesive, bringing a second substrate in contact with the adhesive present on the first substrate, and allowing the adhesive to solidify, whereby the first substrate is bonded to the second substrate. The molten adhesive is applied to the substrate at a temperature of less than 300° F.

BRIEF DESCRIPTION OF THE DRAWING FIGURES

Figure 1B:
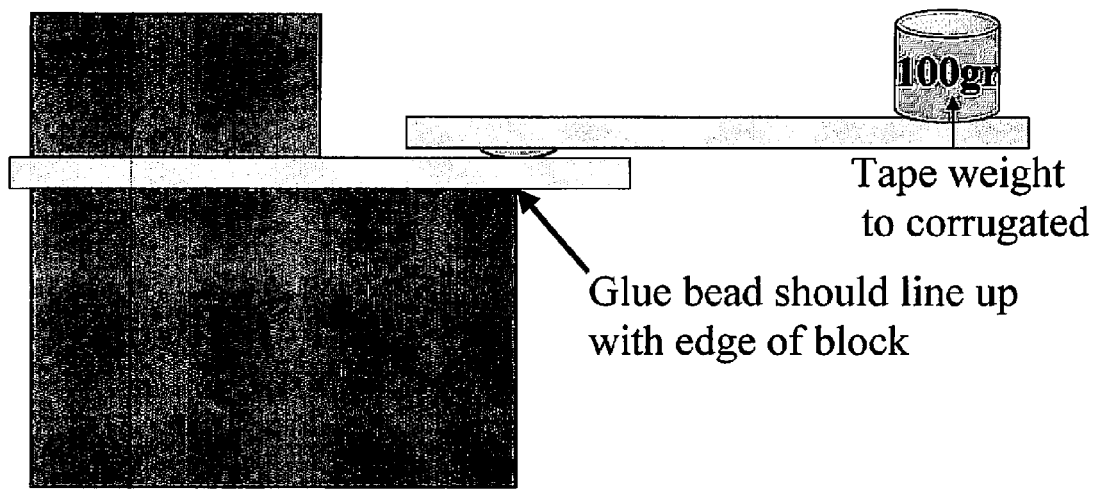

FIGS. 1A and 1B are side views showing placement of the adhesive bead and other dimensional parameters used to measure the heat resistance of an adhesive bond.

DETAILED DESCRIPTION OF THE INVENTION

The invention provides the art with low application temperature hot melt adhesives. A low application hot melt adhesive, also referred to as a low temperature applied hot melt adhesive is defined as adhesive that can be applied to a substrate surface at an adhesive temperature of less than 300° F., and then used to bond the substrate to a second substrate surface. Such adhesives do not require heating to temperatures greater than 300° F. in order to reduce viscosity prior to application. The adhesives of the invention may be formulated for application at temperatures of less than about 275° F., and for application at 250° F. or even lower. The adhesives exhibit high heat resistance and cold temperature adhesion, have adequate open time for bonding and excellent thermal stability at 275° F. for 500 hours.

It has been discovered that low temperature applied hot melt adhesive compositions can be formulated with maleated polyethylene wax and low levels of ethylene α-olefin copolymers. Compared with ethylene vinyl acetate (EVA), ethylene n-butyl acetate (EnBA) and blends of EVA/EnBA based hot melts currently widely used in hot melt adhesives, use of maleated polyethylene wax provides excellent compatibility with various resins and metallocene catalyzed polymers to that exhibit high heat resistance. As demonstrated herein, hot melt adhesives containing on low level of metallocene polymer (25% to 30%) with 5-10% maleated polyethylene wax, such as AC 575P available from Honeywell, shows excellent balance of high and low temperature performance in packaging case and carton adhesives below 300° F.

Polyolefin copolymers that can be used in the practice of the invention include AFFINITY polyolefin plastomers, ENGAGE polyolefin elastomers and INFUSE thermoplastic olefin block copolymer (OBC), available from Dow Chemical.

The hot melt adhesives of invention must comprise at least two different olefin copolymers. The term "different" is used herein to mean that the polymers differ with respect to, for example, Melt Index, melting point, crystallinity, or blockiness.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer.

Required is a metallocene polyethylene copolymer obtained through polymerization of ethylene monomer with an α-olefin (e.g., butane, hexane, octane) using metallocene catalytic system and have a Melt Index of greater than about 400 g/10 min at 190° C.

Such polymers are commercially available from Exxon Mobil Corporation (under the tradename EXACT) or Dow Chemical (under the tradename AFFINITY polymer).

The term "block structure" or "block copolymer" refers to a copolymer comprising two or more chemically distinct regions or segments (also referred to as "blocks") preferably joined in a linear manner, that is, a polymer comprising chemically differentiated units which are joined end-to-end with respect to polymerized ethylenic functionality, rather than in pendent or grafted fashion. The blocks may differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the process making of the copolymers.

Suitable olefin block copolymers that can be used in the practice of the invention may have a random or alternating blocks of semi-crystalline "hard" and elastomeric "soft" segments and are based on ethylene and alpha olefin (propylene, butylene, hexane, octene). Preferred block olefin block copolymers are those having a Melt Index of less than about 35 g/10 min at 190° C. and a melting point of less that 130° C. Useful olefin copolymers having a block structure are olefin copolymers that have a melting point of from 38-104° C. available from Dow Chemical (under the tradename ENGAGE) and olefin copolymer has a melting of from 118-122° C., available from Dow Chemical (under the tradename INFUSE polymer).

The olefin copolymer will be present in amounts of less than 30 wt %, more typically from about 25 to about 30 wt %.

The adhesives of the invention, in addition to the olefin component, must comprise a modified wax, in particular a maleated polyethylene wax. Such maleated polyethylene wax will be present in amounts of less than about 10 wt % more typically from about 5 to 10 wt %. Maleic anhydride modified waxes are available from Eastman Chemical (under the tradename EOPOLENE) and from Honeywell under the tradenames AC-575A, AC-575P, AC-573A, and AC-573P.

In addition to the olefin base polymer and the maleated polyethyolene wax the hot melt adhesive compositions of the invention will generally also comprise a compatible tackifier and/or plactisizer, conventional waxes and typically additives such as stabilizers, antioxidants, pigments and the like.

In addition to the required maleic anhydride modified polyethylene wax, the hot melt adhesives of the invention will typically also contain a petroleum based wax. The term petroleum derived wax includes both paraffin and microcrystalline waxes having melting points within the range of from about 130° F. to about 225° F. as well as synthetic waxes such as low molecular weight polyethylene or Fisher-Tropsch waxes. Most preferred for use are synthetic, Fisher-Tropsch and paraffin waxes. Microcrystalline waxes, in amounts of 5-10 wt %, will typically be used in combination with other waxes.

Tackifying resins useful in the adhesive compositions of this invention include hydrocarbon resins, synthetic polyterpenes, rosin esters, natural terpenes, and the like. The tackifying agent will generally be present at a level of from about 40 to about 70% by weight of the adhesive composition and preferably at a level of at least about 60% by weight.

More particularly, and depending upon the particular base polymer, the useful tackifying resins may include any compatible resins or mixtures thereof such as natural and modified rosins including, for example, as gum rosin, wood rosin, tall oil rosin, distilled rosin, hydrogenated rosin, dimerized rosin, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene; polyterpene resins having a softening point, as determined by ASTM method E28-58T, of from about 80° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof. Mixtures of two or more of the above described tackifying resins may be required for some formulations. Also included are the cyclic or acyclic $C_5$ resins and aromatic modified acyclic or cyclic resins.

Preferred tackifiers are synthetic hydrocarbon resins derived from petroleum. Non-limiting examples include aliphatic olefin derived resins such as those available from Goodyear under the Wingtack® tradename and the Escorez® 1300 series from Exxon. A common $C_5$ tackifying resin in this class is a diene-olefin copolymer of piperylene and 2-methyl-2-butene having a softening point of about 95° C. This resin is available commercially under the tradename Wingtack 95 and is prepared by the cationic polymerization of a mixture containing approximately 60% piperylene, 10% isoprene, 5% cyclo-pentadiene, 15% 2-methyl-2-butene and about 10% dimer, as taught in U.S. Pat. No. 3,577,398. The resins normally have ring and ball softening points as determined by ASTM method E28 between about 20° C. and 150° C. Also useful are $C_9$ aromatic/aliphatic olefin-derived resins available from Exxon in the Escorez 2000 series. Hydrogenated hydrocarbon resins are especially useful. These hydrogenated resins include such resins as the Escorez 5000 series of hydrogenated cycloaliphatic resins from Exxon, hydrogenated $C_9$ and/or $C_5$ resins such as Arkon® P70, P90, P115, P125 supplied by Arakawa Chemical, hydrogenated aromatic hydrocarbon resins such as Regalrez® 1018, 1085 and the Regalite® R series of resins from Hercules Specialty Chemicals. Other useful resins include hydrogenated polyterpenes such as Clearon® P-105, P-115 and P-125 from the Yasuhara Yushi Kogyo Company of Japan. Mixtures of such tackifying agents may also be used.

An antioxidant or stabilizer may also be included in the adhesive compositions described herein in amounts of up to about 3% by weight, more typically in amounts of about 0.5%. Among the stabilizers or antioxidants useful herein are the hindered phenols or hindered phenols in combination with a secondary antioxidant such as distearyl thiodipropionate ("DSTDP") or dilauryl thio-dipropionate ("DLTDP"). Representative hindered phenols include: 1,3,5-trimethyl 2,4,6-tris(3,5-di-tert-butyl-4-hydroxybenzyl)benzene; pentaerythrityl tetrakis-3(3,5-di-tert-butyl-4-hydroxyphenyl) propionate; pentaerythritol tetrakis(3-lauryl thiodipropionate); n-octadecyl-3,5-di-tert-butyl-4-hydroxyphenol)-propionate; 4,4'-methylenebis(2,6-tert-butylphenol); 4,4'-thiobis(6-tert-butyl-o-cresol); 2,6-di-tertbutylphenol; 6-(4-hydroxyphenoxy)-2,4- -triazine; bis(n-octyl-thio)-1,3,5di-n-octadecyl 3,5-di-tert-butyl-4-hydroxy-benzyl-phosphonate; 2-(n-octylthio)ethyl 3,5-di-tert-butyl-4-hydroxy-benzoate; and sorbitol hexa[3-(3,5-di-tert-butyl-4-hydroxyphenyl)-propionate]. Preferred are IRGAFOS 168, a secondary antioxidant available from Ciba and IRGANOX 1010, a hindered phenol primary antioxidant available from Ciba-Geigy. Other antioxidants include ETHANOX 330, a hindered phenol from Albermarle; SANTOVAR, a 2,5 ditert-amyl hydroquinone from Monsanto; and Navagard P a tris(p-nonylphenyl)phosphite from Uniroyal.

Other additives conventionally used in hot melt adhesives to satisfy different properties and meet specific application requirements also may be added to the adhesive composition of this invention. Such additives include, for example, fillers, pigments, flow modifiers, dyestuffs, which may be incorporated in minor or larger amounts into the adhesive formulation, depending on the purpose.

The adhesive compositions of the present invention are prepared by blending the components in the melt at a temperature of, for example, above about 90° C., typically at about 110° C., until a homogeneous blend is obtained, usually about two hours is sufficient. Various methods of blending are known in the art and any method that produces a homogeneous blend is satisfactory.

The hot melt adhesives of the invention find use in, for example, packaging, converting, bookbinding, bag ending and in the non-wovens markets. The adhesives find particular use as case, carton, and tray forming, and as sealing adhesives, including heat sealing applications, for example in the packaging of cereals, cracker and beer products. Encompassed by the invention are containers, e.g., cartons, cases, boxes, bags, trays and the like.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment. Alternatively the adhesive may be applied by the packaging converter prior to shipment to the packager, i.e., the container comprises a pre-applied adhesive. Following the packaging of the container, the container may be heat sealed by conventional means or subjected to any alternative source of energy that heats the adhesive to proper bonding temperatures. The low temperature adhesives of this invention are particularly suitable for these applications because they require less energy to reactive or reheat to the proper temperatures for bond formation. In preferred embodiments, the adhesive to be pre-applied comprises an energy absorbing ingredient.

Substrates to be bonded include virgin and recycled kraft, high and low density kraft, chipboard and various types of treated and coated kraft and chipboard. Composite materials are also used for packaging applications such as for the packaging of alcoholic beverages. These composite materials may include chipboard laminated to an aluminum foil that is further laminated to film materials such as polyethylene, Mylar, polypropylene, polyvinylidene chloride, ethylene vinyl acetate and various other types of films. Additionally, these film materials also may be bonded directly to chipboard or Kraft. The aforementioned substrates by no means represent an exhaustive list, as a tremendous variety of substrates, especially composite materials, find utility in the packaging industry.

The following examples are presented for purpose of illustration and not limitation.

EXAMPLES

In the following examples, which are provided for illustrative purposes only, all parts are by weight and all temperatures in degrees Fahrenheit unless otherwise noted. Heat stress is determined by the method detailed above and illustrated in FIGS. 1A and 1B All adhesive formulations were prepared in single blade mixer heated to 280° F. by mixing the components until homogeneous. The adhesives were then subjected to various tests simulating successful commercial applications.

Formulation ingredients are detailed below.

AF 1900/1000 is a metallocene polyethylene/1-octene copolymer available from Dow Chemical Company under the tradename AFFINITY™ GA 1900 and has a Melt Index of 1000 grams/10 min.

AF 1950/500 is a metallocene polyethylene/1-octene copolymer available from Dow Chemical Company under the tradename AFFINITY™ GA 1950 and has a Melt Index of 500 grams/10 min.

ENGAGE 8130 is a is a metallocene polyethylene/1-octene random copolymer having a Melt Index of less that 35 g/10 min and a softening point of 38-104° C., available from Dow Chemical Company.

ENGAGE 8200 is a is a metallocene polyethylene/1-octene random copolymer having a Melt Index of less that 35 g/10 min and a softening point of 38-104° C., available from Dow Chemical Company.

OBC D9808.15 is a is a polyethylene/1-octene block copolymer having a Melt Index of less that 35 g/10 min and a softening point of 118-122° C., available from Dow Chemical Company.

AC 575P is a maleic anhydride polyethylene wax with a Saponification number of 20-40 mg KOH/gm (test method 357-OR-1), available from Honeywell.

AC 573P is a maleic anhydride polyethylene wax with a Saponification number of 3-6 mg KOH/gm (test method 357-OR-1) available from Honeywell.

Calista 158/101 1339 is a Fischer Tropsch wax, having a melting point of 158° F., available from IGI/Shell oil.

C80 is Paraflint C80 propylene wax, which is a Fischer Tropsch fractionated wax, available from Sasol.

Parvan 1471 is a paraffin wax from ExxonMobil Company.

$C_5$ HC represents a $C_5$ hydrocarbon tackifying resin.
$C_9$ HC represents a $C_9$ hydrocarbon tackifying resin.
$C_5$-$C_9$ HC represents a $C_5$-$C_9$ hydrocarbon tackifying resin.
RE represents a rosin ester tackifier.

Melt viscosities of hot melt adhesives were determined on a Brookfield Thermosel viscometer using a No. 27 spindle.

Adhesion at 120° F., 130° F., 135° F. and 140° F., depending of the substrate was determined by applying a half inch wide bead of adhesive at 250° F. to a 2"×3" piece of double fluted corrugated board, and immediately bringing a second piece of corrugated board into contact to form a bond. A 200 g weight was immediately placed on the top of the bond for 2 seconds to provide compression. The specimens prepared were conditioned at room temperature for overnight and then placed in oven or refrigerators at different temperatures for 8-24 hr. The bonds were separated by hand and the resulting fiber tear was recorded.

For the heat stress test (HS) three bonds with glue line dimension of 2"×6" flutes running along 2"side was subjected to a 100 g force and placed in an oven starting at 130° F. to 150° F. for 8 hr and 24 hr respectively. The test results were recorded as passes (two bonds pass); fail (two bonds failed). See FIGS. 1A and 1B.

The cloud point temperature is the temperature at which a component begins to solidify or "cloud up" as it cools from a clear homogeneous liquid phase to the semisolid phase. For example, for waxes, the cloud point is usually close to the wax's melting point. Compatibility is related to an Adhesive's cloud point, where generally speaking, the lower the cloud point the greater the compatibility.

Example 1

Adhesive samples were made with and without maleated polyethylene (PE) wax (AC 575P).

TABLE 1

| Ingredients | Sample 1 | Sample 2 | Sample 3 | Sample 4 | Sample 5 | Sample 6 |
|---|---|---|---|---|---|---|
| AF 1900/1000 | 20 | 25 | 20 | 20 | 25 | 25 |
| AF 1950/500 | 10 | | | | | |
| ENGAGE 8130 | | | 5 | | 5 | |
| ENGAGE 8200 | | | | 5 | | 5 |
| AC 575P | | 5 | | | 5 | 5 |
| Calista 158 | 25 | 30 | 30 | 30 | 25 | 25 |
| $C_5$ HC | 35 | 35 | 40 | 40 | 40 | 35 |
| $C_9$ HC | 5 | 5 | 5 | 5 | | 5 |
| RE | 5 | | | | | |
| Color | Light yellow | White | White | White | White | White |
| Clarity | Almost Clear | Clear | Clear | Clear | Clear | Clear |
| Viscosity @ 250° F. | 1425 cps | 715 cps | 1550 cps | 1800 cps | 2695 cps | 1920 cps |
| Adhesion | | | | | | |
| RT | 90 | 95 | 90 | 90 | 100 | 90 |
| | 95 | 95 | 80 | 95 | 100 | 100 |
| | 90 | 85 | 85 | 90 | 95 | 95 |
| 40° F. | 90 | 95 | 40 | 75 | 100 | 100 |
| | 80 | 90 | 85 | 75 | 100 | 85 |
| | 80 | 100 | 85 | 80 | 95 | 90 |
| 20° F. | 90 | 10 | 40 | 50 | 95 | 50 |
| | 75 | 25 | 20 | 15 | 90 | 80 |
| | 50 | 50 | 25 | 75 | 90 | 40 |
| Heat stress | | | | | | |
| 130° F. | Pass | | Pass | Pass | | |
| 135° F. | Pass | Pass | 8 hrs | 8 hs | Pass | Pass |
| 140° F. | Fail | Pass | | | Pass | Pass |
| 145° F. | | 2-3 hrs | | | Pass | Pass |
| 150° F. | | | | | 8 hrs | Pass |

As can be seen from the results set forth in Table 1, higher heat stress values were observed using AC 575P in combination with AFFINITY and ENGAGE metallocene polymer compare to adhesives formulated without AC575P. Samples 1, 3 and 4, formulated without AC 575P have lower heat stress values compare to Samples 2, 5 and 6.

Example 2

Adhesive samples were made to compare the effect of maleated polyethylene (PE) wax AC 574P with the lower viscosity AC 573P. Formulations and performance results are shown in Table 2.

TABLE 2

| Ingredients | Sample 7 | Sample 8 | Sample 9 | Sample 10 | Sample 11 |
|---|---|---|---|---|---|
| AF 1900/1000 | 20 | 20 | 20 | 20 | 20 |
| AF 1950/500 |  | 10 |  | 10 |  |
| ENGAGE 8130 | 5 |  | 5 |  |  |
| OBC D9808.15 |  |  |  |  | 5 |
| AC 575P | 5 | 5 |  |  | 5 |
| AC 573P |  |  | 5 | 5 |  |
| 754-53 Calista 158 | 30 | 25 | 30 | 25 | 30 |
| $C_5$ HC | 35 | 35 | 35 | 35 | 35 |
| $C_5$-$C_9$ HC | 5 | 5 | 5 | 5 | 5 |
| Color | off White | Off White | Off white | Off white | Off white |
| Clarity | Clear | Clear | Clear | Clear | Clear |
| Viscosity @ 250° F. | 1630 cps | 1475 cps | 1460 cps | 1355 cps | 1550 cps |
| Cloud point | 180-185 F. | 180-185 F. | 180-185 F. | 180-185 F. | 180-185 F. |
| Adhesion |  |  |  |  |  |
| RT | 90 | 95 | 100 | 100 | 90 |
|  | 95 | 100 | 90 | 100 | 95 |
|  | 100 | 95 | 95 | 95 | 95 |
| 40° F. | 100 | 100 | 95 | 95 | 98 |
|  | 90 | 95 | 90 | 95 | 90 |
|  | 95 | 95 | 85 | 90 | 100 |
| 20° F. | 85 | 90 | 90 | 95 | 98 |
|  | 95 | 80 | 95 | 65 | 70 |
|  | 90 | 95 | 45 | 80 | 85 |
| Heat stress |  |  |  |  |  |
| 130° F. | Pass | Pass | Pass | Pass |  |
| 135° F. | Pass | Pass | Pass | Pass |  |
| 140° F. | Pass | Pass | Pass | Pass | Pass |
| 145° F. | Pass | Pass | Fail | Fail | Pass |
| 150° F. | Pass | Pass |  |  | Pass |
| 155° F. | Fail | Fail |  |  |  |
| Set time | 3.0-3.5 sec |  |  |  |  |
| Open time | 7.5-8.0 sec |  |  |  |  |

As can be seen from the results set forth in Table 2, AFFINITY, ENGAGE and OBC in combination with AC 575P gave excellent heat stress value at 250° F. application. Sample 7 (AFFINITY+ENGAGE), Sample 8 (AFFINITY 1000MI+AFFINITY 500MI) and Sample 11 (AFFINITY+OBC) gave higher heat stress passed 150° F. and also good cold adhesion. It can be seen that when AC 575P was replaced by lower viscosity AC 573P (Samples 9 and 10), the formulations passed 140° F. heat stress but the AC 575P containing formulations (Samples 7 and 8) gave 5-10° F. higher heat stress values in same formulations.

Example 3

Adhesive formulations were prepared that contained different amounts of AC 575P. The formulations and performance results are shown in Table 3.

TABLE 3

| Ingredients | Sample 12 | Sample 13 | Sample 14 | Sample 15 |
|---|---|---|---|---|
| AF 1900/1000 | 20 | 20 | 20 | 20 |
| ENGAGE 8130 | 5 | 5 | 5 | 5 |
| AC 575P | 7 | 10 | 15 | 20 |
| Calista 158 | 28 | 25 | 20 | 15 |
| $C_5$ HC | 35 | 35 | 35 | 35 |
| $C_5$-$C_9$ HC | 5 | 5 | 5 | 5 |
| Color | Off White | Off White | Off White | Off White |
| Calrity | Clear | Clear | Clear | Clear |
| Viscosity @ 250° F. | 1630 cps | 2135 cps | 2960 cps | 4265 cps |
| Adhesion |  |  |  |  |
| RT | 95 | 95 | 100 | 100 |
|  | 85 | 95 | 100 | 100 |
|  | 85 | 95 | 95 | 95 |
| 40° F. | 60 | 50 | 95 | 95 |
|  | 95 | 70 | 95 | 95 |
|  | 60 | 85 | 75 | 85 |
| 20° F. | 20 | 10 | 65 | 95 |
|  | 45 | 45 | 95 | 65 |
|  | 70 | 20 | 45 | 65 |
| Heat stress |  |  |  |  |
| 135° F. | Pass | Pass | Pass | Pass(2/3) |
| 140° F. | Pass | Pass | Pass | Pass 8 hrs |
| 145° F. | Pass | Fail | Pass | na |
| 150° F. | Pass |  | Pass 8 hrs |  |
| 155° F. | Fail |  |  |  |

As can be seen from the results set forth in Table 3, increase in % of AC 575P increased viscosity of formulations at 250° F.

Example 4

Adhesive samples 16-18 having the formulation set forth in Table 4 were applied at 275° F. Performance results are show in Table 4.

TABLE 4

| Ingredients | Sample 16 | Sample 17 | Sample 18 |
|---|---|---|---|
| AF 1900/1000 | 22 | 20 | 20 |
| ENGAGE 8130 | 5 | 6 | 6 |
| AC 575P | 5 | 5 | 5 |
| Calista 158 | 28 | 30 | 30 |
| C$_5$ HC | 35 | 24 | 24 |
| C$_9$ HC | 5 | | |
| C$_5$-C$_9$ HC | | 15 | 15 |
| Color | White | Off white | Off white |
| Clarity | Clear | Clear | clear |
| Viscosity | | | |
| @ 250° F. | 1905 cps | 1965 cps | 1905 cps |
| @ 275° F. | 1230 cps | 1385 cps | 1360 cps |
| Adhesion | | | |
| RT | 95 | 90 | 95 |
|  | 95 | 95 | 95 |
| 40° F. | 100 | 100 | 60 |
|  | 95 | 95 | 95 |
|  | 95 | 90 | 95 |
| 20° F. | 70 | 80 | 40 |
|  | 80 | 35 | 70 |
|  | 90 | 90 | 95 |
|  |  | 45 | 85 |
|  |  | 90 | 70 |
| Heat stress | | | |
| 130° F. | Na | | |
| 135° F. | Pass | Pass | Pass |
| 140° F. | Pass | Pass | Pass |
| 145° F. | Pass | Pass | Pass |
| 150° F. | Pass | Pass | 8 hrs |
| 155° F. | Fail | | |
| 135° F. adhesion | | 95/85 | 45/25 |
|  | | 90/80 | 20 |
|  | | 85/75 | 15 |

As can be seen in Table 4, increase in % of polymer increases the viscosity of all above formulations but when applied at 275° F. all three formulations had higher heat stress and good cold adhesion.

Example 5

Adhesive Samples 19-21 having the formulation set forth in Table 5 were prepared. Performance results are show in Table 5.

TABLE 5

| Ingredients | Sample 19 | Sample 20 | Sample 21 |
|---|---|---|---|
| AF 1900/1000 | 20 | 20 | 20 |
| ENGAGE 8130 | 5 | 5 | 5 |
| AC 575P | 5 | 5 | 5 |
| Calista 158 | 27 | 27 | |
| Parvan 1471 | 3 | 3 | |
| C 80 | | | 30 |
| C$_5$ HC | 35 | 32 | 35 |
| C$_9$ HC | | 8 | |
| C$_5$-C$_9$ HC | 5 | | 5 |
| Color | Off White | Off White | Off White |
| Clarity | Clear | Clear | Clear |
| Viscosity at 250° F. | 1585 cps | 1540 cps | 1900 cps |
| Adhesion | | | |
| RT | 80 | 100 | 100 |
|  | 100 | 100 | 100 |
| 40° F. | 45 | 60 | 25 |
|  | 30 | 85 | 25 |
|  | 95 | | 40 |
| 20° F. | 50 | 25 | 25 |
|  | 25 | 75 | 20 |
|  | 80 | 60 | 50 |
|  | 30 | | 35 |
|  | 65 | | 10 |
| 135° F. | 65 | | 95 |
|  | 10 | | 100 |
|  | 25 | | 95 |
| Heat stress | | | |
| 130° F. | | Pass | |
| 135° F. | Pass | Pass | Pass |
| 140° F. | Pass | Pass | Pass |
| 145° F. | Pass | Pass | Pass |
| 150° F. | 8 hrs | Pass | Pass |
| 155° F. | | | |

As can be seen from the results shown in Table 5, addition of 3% of paraffin wax in Samples 19 and 20 reduce the viscosity of these formulations and gave good heat stress but did not improve cold adhesion. Addition of 30% of C80 wax in the Sample 21 formulation increases viscosity at 250° F. but high temperature adhesion at 135° F. was improved.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A low application temperature hot melt adhesive comprising a polyolefin copolymer component and a maleated polyethylene wax component,
   wherein said polyolefin copolymer component comprises two different polyolefin copolymers comprising:
   (A) a first polyolefin copolymer that (i) is a metallocene-catalyzed ethylene/α-olefin copolymer prepared from ethylene and 1-octene monomers, and (ii) has a Melt Index of greater than about 400 g/10 min at 190° C.; and
   (B) a second polyolefin copolymer that (i) has at least about 50 mol % of ethylene content and (ii) has a Melt Index less than about 35 g/10 min at 190° C.

2. The adhesive of claim 1 wherein the first polyolefin copolymer has a Melt Index greater than about 500 g/10 min at 190° C.

3. The adhesive of claim 1, wherein the second polyolefin copolymer is an ethylene-octene-based olefin block copolymer.

4. The adhesive of claim 1, wherein the second polyolefin copolymer is a random ethylene-octene-based copolymer.

5. The adhesive of claim 1 further, wherein the second polyolefin copolymer comprises at least 60 mol % of ethylene content.

6. The adhesive of claim 1 further, wherein the second polyolefin copolymer is a metallocene-catalyzed polymer.

7. The adhesive of claim 3 wherein the ethylene-octene-based olefin block copolymer has a melting point of 118-122° C.

8. The adhesive of claim 4, the random ethylene-octene-based copolymer has a melting point of 38-104° C.

9. A low application temperature hot melt adhesive comprising less than 30 wt % of by weight of a polyolefin copolymer component and less than 10% by weight of a maleated polyethylene wax component;
   wherein the polyolefin copolymer component comprises two polyolefin copolymers;
   wherein the first polyolefin copolymer (1) is a metallocene-catalyzed ethylene/α-olefin copolymer prepared from ethylene and 1-octene monomers; and (2) has a Melt Index of greater than about 400 g/10 min at 190° C., and
   wherein the adhesive has a viscosity at 120° C. of below about 3000 centipoises.

10. The adhesive of claim 9 comprising from 25 to 30 wt % of said polyolefin copolymer component and from 5-10 wt % of said maleated polyethylene wax component.

11. The adhesive of claim 10 further comprising a wax component different from said maleated polyethylene wax component.

12. A packaged article comprising the hot melt adhesive of claim 9, which is a carton, case, tray or bag.

13. The packaged article of claim 12 which is a packaged food article.

* * * * *

UNITED STATES PATENT AND TRADEMARK OFFICE
CERTIFICATE OF CORRECTION

PATENT NO. : 8,877,305 B2  
APPLICATION NO. : 13/361197  
DATED : November 4, 2014  
INVENTOR(S) : Jagruti B. Patel, Andrea Keys Eodice and Yew Guan Low Page 1 of 1

It is certified that error appears in the above-identified patent and that said Letters Patent is hereby corrected as shown below:

Specification  
Column 5, line 49: Change "thio-dipropionate" to -- thiodipropionate --.  
Column 5, line 57: After "-4", delete "-triazine;".  
Column 5, line 58: After "5", insert -- -triazine; --.  
Column 7, lines 12: After "is a", delete "is a".  
Column 7, line 30: Change "158/101" to -- 158/IGI --.  
Column 11, line 8: Change "show" to -- shown --.  
Column 11, line 53: Change "show" to -- shown --.  
Claims  
Column 12, lines 52, claim 2: After "claim 1", insert -- , --.  
Column 12, lines 65, claim 7: After "claim 3", insert -- , --.  
Column 13, line 15, claim 10: After "claim 9", insert -- , --.  
Column 13, line 18, claim 11: After "claim 10", insert -- , --.

Signed and Sealed this  
Thirteenth Day of September, 2016

Michelle K. Lee  
*Director of the United States Patent and Trademark Office*